United States Patent
Ifuku et al.

(10) Patent No.: US 10,028,432 B2
(45) Date of Patent: Jul. 24, 2018

(54) VEGETATION CUTTER

(71) Applicant: MAKITA CORPORATION, Aichi (JP)

(72) Inventors: Yasuo Ifuku, Aichi (JP); Akihiro Nomura, Aichi (JP)

(73) Assignee: MAKITA CORPORATION, Aichi (JP)

( * ) Notice: Subject to any disclaimer, the term of this patent is extended or adjusted under 35 U.S.C. 154(b) by 676 days.

(21) Appl. No.: 14/274,907

(22) Filed: May 12, 2014

(65) Prior Publication Data

US 2014/0352160 A1    Dec. 4, 2014

(30) Foreign Application Priority Data

May 31, 2013   (JP) .................................. 2013-115200

(51) Int. Cl.
   *A01D 34/416*   (2006.01)
   *A01D 34/90*   (2006.01)
(52) U.S. Cl.
   CPC ........... *A01D 34/416* (2013.01); *A01D 34/90* (2013.01); *A01D 2034/907* (2013.01)
(58) Field of Classification Search
   CPC ..... A01D 34/416; A01D 34/90; A01D 34/902
   (Continued)

(56) References Cited

U.S. PATENT DOCUMENTS

D372,053 S  *  7/1996  Couch ........................... D14/412
5,868,377 A     2/1999  Taomo et al.
(Continued)

FOREIGN PATENT DOCUMENTS

DE    19624285    1/1997
JP    H07-36611   7/1995
(Continued)

OTHER PUBLICATIONS

German Office Action in counterpart German application No. 10 2014 006 910.9, dated Jan. 2, 2018, along with partial English-language translation.

*Primary Examiner* — Jason Daniel Prone
*Assistant Examiner* — Richard Crosby, Jr.
(74) *Attorney, Agent, or Firm* — Greenblum & Bernstein, P.L.C.

(57) ABSTRACT

A vegetation cutter comprises: a frame rod having a longitudinal axis and a front end; a rotary cutter mounted on the front end of the frame rod; a drive motor for driving the rotary cutter; a grip disposed around the frame rod and having an external surface to be held by a user; a power switch trigger arranged on the grip for energizing the drive motor; and a safety lock mechanism for rendering the power switch trigger inoperative when the safety lock mechanism is in a lock position and for rendering the power switch trigger operative when the safety lock mechanism is in a release position. The safety lock mechanism includes a manipulating knob for selectively setting the safety lock mechanism in the lock position and in the release position. The manipulating knob is disposed on the grip at a position circumferentially opposite to the power switch trigger and is turnable around an axis which is parallel to the longitudinal axis of the frame rod to selectively bring the safety lock mechanism to the lock position and the release position.

6 Claims, 6 Drawing Sheets

(58) Field of Classification Search
USPC .......................................................... 30/276
See application file for complete search history.

(56) References Cited

U.S. PATENT DOCUMENTS

| | | | | |
|---|---|---|---|---|
| 5,933,966 | A * | 8/1999 | Yates | A01D 34/90 30/276 |
| 6,055,797 | A * | 5/2000 | Nagashima | A01D 34/90 56/11.3 |
| 6,138,364 | A * | 10/2000 | Schmitz | B23D 49/11 173/29 |
| 6,938,587 | B2 * | 9/2005 | Thomas | F02P 13/00 123/41.56 |
| 6,996,960 | B1 * | 2/2006 | Flemm | A01G 3/062 30/276 |
| 7,382,104 | B2 * | 6/2008 | Jacobson | A01D 34/902 15/330 |
| 7,805,844 | B2 * | 10/2010 | Yoshida | A01D 34/90 30/276 |
| 8,006,392 | B2 * | 8/2011 | Moreno | B23D 49/167 30/377 |
| 8,033,026 | B2 * | 10/2011 | Gibbons | B23D 51/025 30/371 |
| 8,151,471 | B2 * | 4/2012 | Tomiyama | A01D 34/90 200/321 |
| D690,569 | S * | 10/2013 | Tinius | D8/61 |
| D692,287 | S * | 10/2013 | Tinius | D8/61 |
| 8,578,615 | B2 * | 11/2013 | Baskar | B23D 51/02 30/376 |
| 9,049,816 | B2 * | 6/2015 | Ito | A01D 34/902 |
| 2006/0248731 | A1 * | 11/2006 | Suzuki | A01D 34/90 30/276 |
| 2007/0067947 | A1 * | 3/2007 | Hittmann | B25F 5/026 15/405 |
| 2009/0077814 | A1 * | 3/2009 | Gibbons | B23D 49/167 30/376 |
| 2010/0146798 | A1 * | 6/2010 | Emmerich | F01M 3/00 30/277.4 |
| 2010/0313430 | A1 * | 12/2010 | Yamaoka | A01D 34/90 30/276 |
| 2011/0203118 | A1 * | 8/2011 | Saito | A01D 34/902 30/276 |
| 2012/0246943 | A1 * | 10/2012 | Yuasa | A01D 34/905 30/276 |
| 2012/0279743 | A1 * | 11/2012 | Suda | B25F 5/001 173/176 |
| 2012/0317823 | A1 * | 12/2012 | Vantran | B23D 51/10 30/376 |

FOREIGN PATENT DOCUMENTS

JP  2011-50313  3/2011
WO  2011/027629  3/2011

* cited by examiner

VEGETATION CUTTER

TECHNICAL FIELD

The present invention relates to a vegetation cutter such as a grass cutter, a lawn trimmer and a brush cutter, and more particularly to a vegetation cutter which comprises a frame rod, a rotary cutter mounted on the front end of the frame rod, a drive motor for driving the rotary cutter, a grip arranged around the frame rod to be held by a user while operating the vegetation cutter, a power switch trigger arranged on the grip for energizing the drive motor, and a safety lock mechanism for rendering the power switch trigger inoperative when the safety lock mechanism is in its lock position and for rendering the power switch trigger operative when the safety lock mechanism is in its release position, in which a manipulating knob of the safety lock mechanism is disposed on the grip at a position circumferentially opposite to the power switch trigger for selectively bringing the safety lock mechanism to its lock position or to its release position.

BACKGROUND INFORMATION

A vegetation cutter is a kind of work apparatus for cutting grass or brush growing on the ground. An example of a vegetation cutter is disclosed in JP unexamined patent publication No. 2011-50313 A and in WO 2011/027629 A1, which comprises a frame rod (main pole), a rotary cutter (cutting line) mounted on the front end of the frame rod, and a drive motor (electric motor) mounted on the rear end of the frame rod for driving the rotary cutter. The vegetation cutter is provided with a loop handle on the middle part of the frame rod to be held with the left hand and a grip around the frame rod in the rearward of the loop handle to be held with the right hand by the user while operating the vegetation cutter. The grip is provided with a power switch trigger for energizing the drive motor and also with a safety lock mechanism for rendering the power switch trigger inoperative in the lock position and operative in the release position for preventing the power switch trigger from being erroneously actuated. The power switch trigger is arranged in the lower side of the grip at the position where the power switch trigger is operative by the index finger and/or the middle finger of the user while the user is holding the grip with his/her right hand. The manipulating lever of the safety lock mechanism is disposed in the left side of the grip at the position where the lever is operable with the right thumb of the user.

When the user is to operate the vegetation cutter to cut grass, the user holds the loop handle with his/her left hand and holds the grip with his/her right hand, and, pressing the manipulating lever of the lock release mechanism (herein the "lock release lever" for brevity) with his/her right thumb to release the safety lock mechanism, presses the power switch trigger with the index and/or middle finger of his/her right hand to energize the drive motor to rotate the rotary cutter. As the user keeps the rotary cutter floating a little bit above the ground and swings the frame rod right and left to have the rotary cutter sweep right and left on the grass, the grass growing on the ground will be cut off.

When this type of vegetation cutter is in use to cut grass on the ground, the rotary cutter is kept rotating generally in a horizontal plane and is moved horizontally a bit above and in parallel with the ground. If there is an obstacle like an upright post or a vertical wall of a building on the ground, the rotating cutter should not be moved so close to the obstacle that the rotating cutter may touch it and may be damaged. Thus it was hard to cleanly cut the grass near the obstacle. In order to cope with this situation, the user would direct the rotating cutter vertical to the ground by turning the frame rod circumferentially by 90 degrees thereby to move the rotating cutter along the vertical obstacle to cut the grass near the obstacle. With the vegetation cutter assuming this posture, the power switch trigger is directed sideward and the lock release lever is directed above or below the grip so that the user would hold the grip in a little bit uncomfortable way with his/her right thumb pushing the lock release lever to release the safety lock mechanism and with his/her right index or middle finger pressing the power switch trigger to energize the drive motor.

SUMMARY OF THE INVENTION

In view of the foregoing circumstances, therefore, it is a primary object of the present invention to provide a vegetation cutter having a configuration in which the lock release member can be manipulated in a comfortable way.

According to the present invention, the object is accomplished by providing a vegetation cutter comprising: a frame rod having a longitudinal axis and a front end; a rotary cutter mounted on the front end of the frame rod; a drive motor for driving the rotary cutter; a grip arranged around the frame rod and having an external surface to be held by a user; a power switch trigger arranged on the grip for energizing the drive motor; and a safety lock mechanism for rendering the power switch trigger inoperative when the safety lock mechanism is in a lock position and for rendering the power switch trigger operative when the safety lock mechanism is in a release position, wherein the safety lock mechanism includes a manipulating knob disposed on the grip at a position circumferentially opposite to the power switch trigger and is turnable around an axis which is parallel to the longitudinal axis of the frame rod to selectively bring the safety lock mechanism to the lock position and the release position.

With the vegetation cutter configured as above, in which the manipulating knob is disposed on the grip at a position circumferentially opposite to the power switch trigger, as the user holds the grip with his/her index or middle finger touching the power switch trigger, the manipulating knob will be at such a position as to be comfortably manipulated by the thumb. Thus, not only when the vegetation cutter is used with the rotary cutter rotating in a plane parallel with the ground, but also when the vegetation cutter is used with the rotary cutter rotating in a plane perpendicular to the ground by turning the frame rod circumferentially by 90 degrees, the user will feel comfortable in operating the vegetation cutter by holding the grip with his/her hand, and with his/her index or middle finger manipulating the power switch trigger and simultaneously with his/her thumb manipulating the manipulating knob of the safety lock mechanism. Further, as the manipulating knob is disposed to be turned around an axis which is parallel to the longitudinal axis of the frame rod in bringing the safety lock mechanism to the lock position and the release position, the manipulating knob will not be operated inadvertently when the user simply grasps the grip, which configuration prevents erroneous simultaneous actuations of the power switch trigger and the manipulating knob by the user's single action of grasping the grip.

In an aspect of the present invention, the manipulating knob may preferably be urged to normally stay at a neutral position bringing the safety lock mechanism to the lock position and may preferably be turnable toward a clockwise direction and toward a counterclockwise direction when forced by the user, to bring the safety lock mechanism to the release position by turning in either direction. With this configuration, the user can bring the safety lock mechanism to the release position by turning the manipulating knob either clockwise or counterclockwise in the circumferential direction of the grip from the neutral position, which provides an improved manipulability of the manipulating knob. In addition, both in the case where the grip is held so that the frame rod is turned clockwise from the normal posture and in the case where the grip is held so that the frame rod is turned counterclockwise from the normal posture, the user can actuate the manipulating knob to bring the safety lock mechanism to the release position without directing the wrist to an uncomfortable posture, which provides an improved manipulability of the manipulating knob.

In a further aspect of the present invention, the manipulating knob may preferably have a manipulation surface curved and extending circumferentially over and along the external surface of the grip and having a middle portion with two ends, and may preferably have two first protrusions formed on the manipulation surface at the two ends of the middle portion, respectively. With this configuration, the user can easily and comfortably actuate the manipulating knob by placing his/her thumb on the middle portion of the manipulation surface and pushing either of the first protrusions outward to turn the manipulating knob clockwise or counterclockwise, which provides an improved manipulability of the manipulating knob.

In a still further aspect of the present invention, the manipulation surface may preferably further extends circumferentially beyond the first protrusions and the manipulating knob may preferably further have second protrusions formed on the manipulation surface beyond and apart from the respective first protrusions. With this configuration, the user can easily and comfortably actuate the manipulating knob by placing his/her thumb on the manipulation surface between one of the first protrusions and the opposing second protrusion and pushing either the first or the second protrusion, when the frame rod is held turned clockwise or counterclockwise from the normal posture by some amount of angle, which provides an improved manipulability of the manipulating knob.

BRIEF DESCRIPTION OF THE DRAWINGS

For a better understanding of the present invention, and to show how the same may be practiced and will work, reference will now be made, by way of example, to the accompanying drawings, in which:

FIG. 1b is an enlarged perspective view of the rotary cutter included in the vegetation cutter of FIG. 1a;

DETAILED DESCRIPTION OF EMBODIMENTS OF THE INVENTION

Figure 1A:
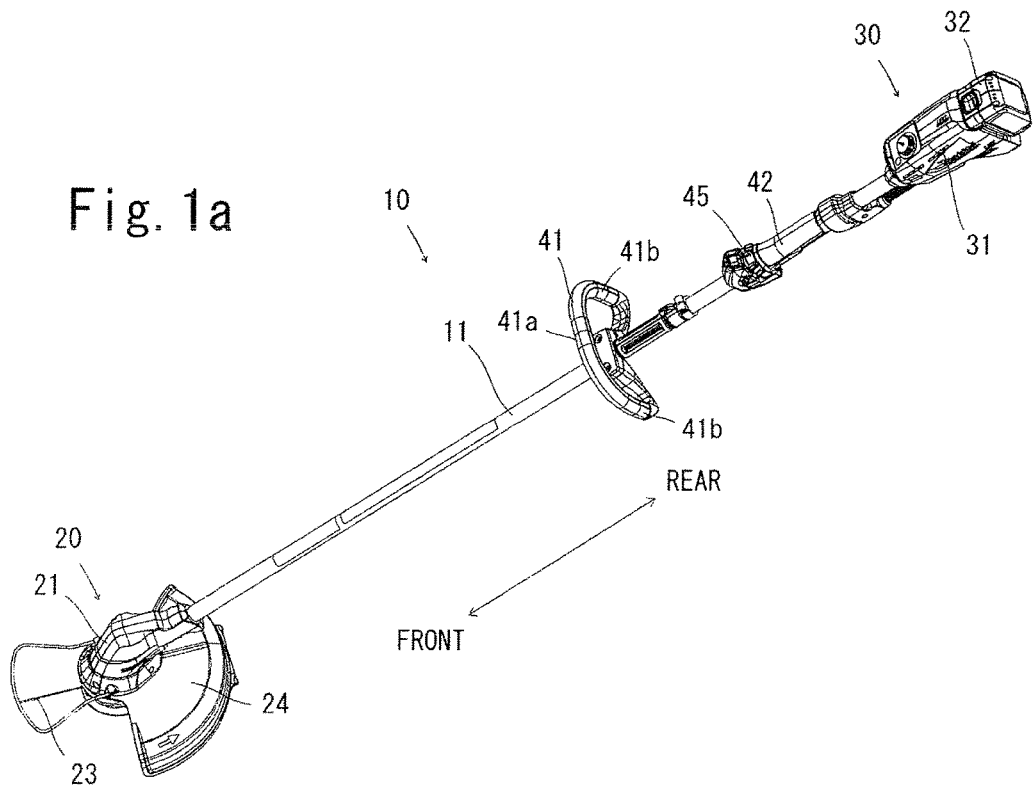
FIG. 1a is an overall perspective view of an embodiment of a vegetation cutter according to the present invention.

The invention and its embodiments can now be better understood by turning to the following detailed description of the preferred embodiments with reference to the accompanying drawings. The embodiments of the vegetation cutter hereunder described are of an electric motor-driven type.

It should be expressly understood that the illustrated embodiments are presented just as practicable examples of the invention and that the invention as defined by the claims may be broader than the illustrated embodiments described below. In the drawing, like reference characters refer to like parts so that repetitive explanations may be omitted.

FIG. 1a illustrates an overall view of an embodiment of a vegetation cutter according to the present invention, in which the vegetation cutter 10 comprises a frame rod 11 of an elongate hollow cylindrical tube extending longitudinally from front to rear, a cutter head 20 mounted on the front end portion of the frame rod 11, and a controller head 30 mounted on the rear end portion of the frame rod 11.

Figure 1B:
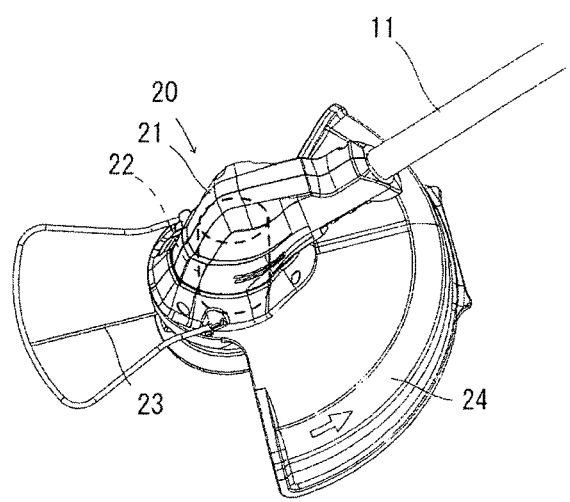

The cutter head 20 includes a front housing 21 fixed to the front end portion of the frame rod 11. As illustrated in an enlarged view of FIG. 1b, the front housing 21 encloses a drive motor (an electric motor) 22 having a motor output shaft (not shown). The front housing 21 rotatably supports a cutter shaft (not shown), which is coupled to a reduction gear, which in turn engages the motor output shaft so that the drive motor 22 rotates the cutter shaft when energized. The lower end portion of the cutter shaft is projected downward from the front housing 21 and is detachably provided with a filament line made of, for example, polyamide resin to constitute a rotary cutter 23. The rear part of the front housing 21 is provided with a cutter guard 24 to cover the back area of the rotary cutter 23.

The controller head 30 is constituted mainly of a rear housing 31 and a control circuit (not shown) enclosed therein. The rear housing 31 is fixed to the rear end portion of the frame rod 11, and to the back of the rear housing 31 is detachably fixed a battery pack 32. The battery pack 32 is electrically connected to the drive motor 22 in the cutter head 20 via an electric wiring disposed through the inner bore of the frame rod 11.

Figure 2:
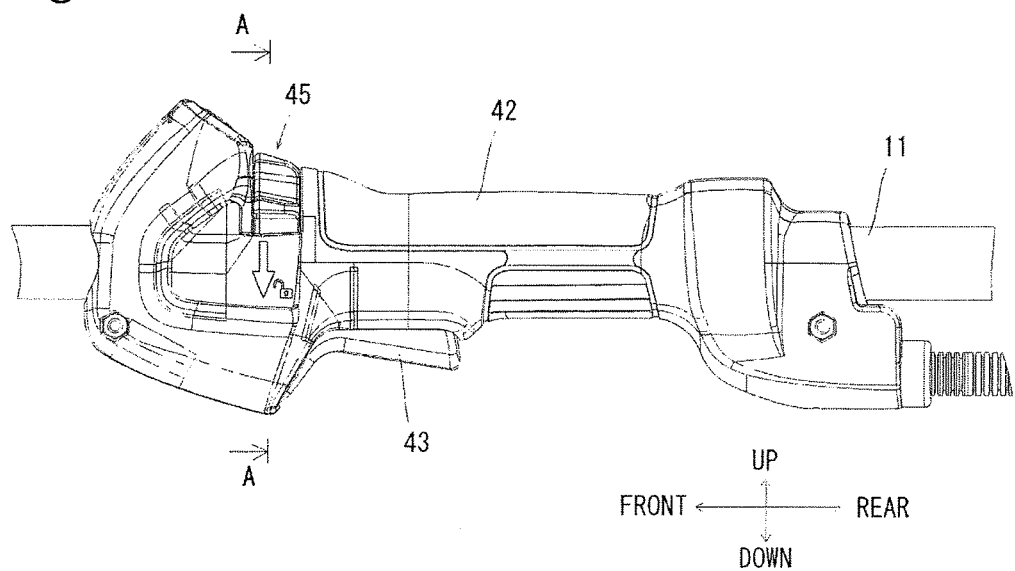
FIG. 2 is a side elevational view of a grip disposed around the frame rod included in the vegetation cutter.
Figure 3:
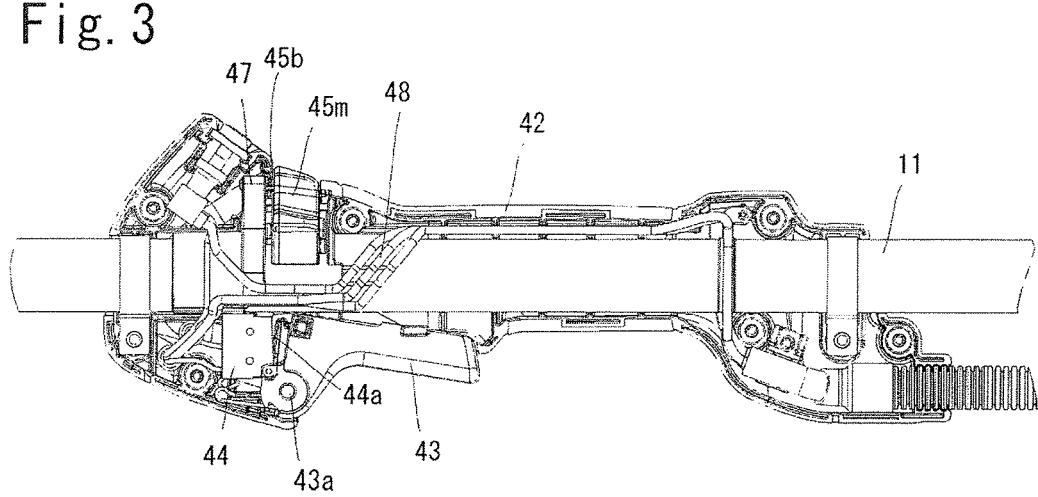
FIG. 3 is a side elevational view of the grip with its left half member taken away.

As shown in FIG. 1a, a loop handle 41 is arranged on the middle portion of the frame rod 11. The loop handle 41 includes an upper portion 41a and side portions 41b, 41b. In addition, a grip 42 is disposed around the frame rod 11 to the rear of the loop handle 41. As shown in FIGS. 2 and 3, the grip 42 is of a generally tubular shape having a larger diameter than the frame rod 11, and is provided with a power switch trigger 43 for energizing the drive motor 22 at the lower position of the longitudinally middle part of the grip 42.

Figure 4:
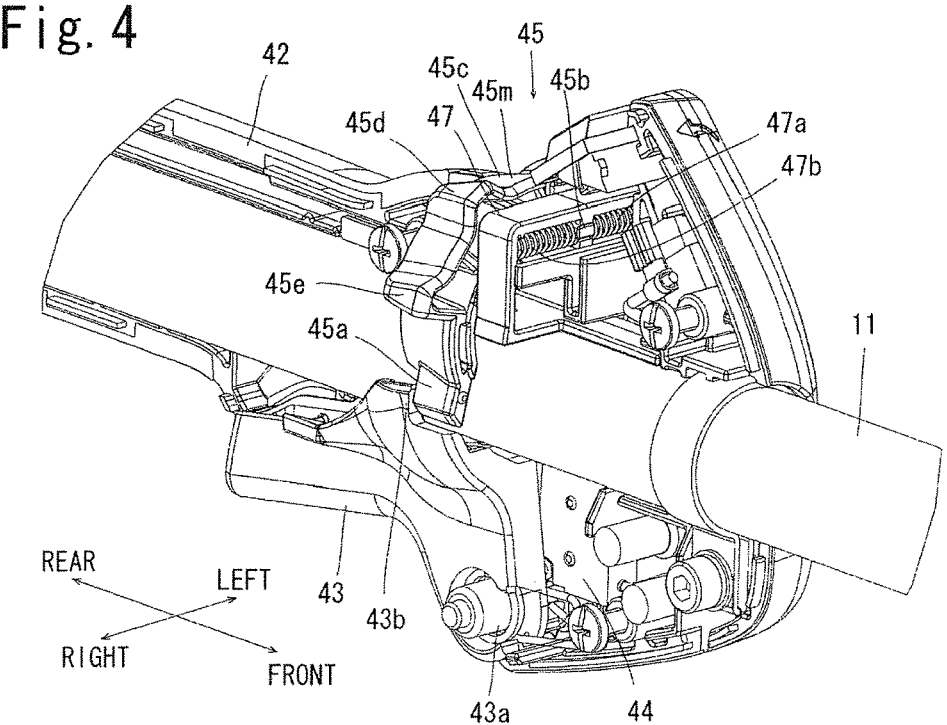
FIG. 4 is a perspective view of the front part of the grip attached to the frame rod and with its right half member taken away, where the safety lock mechanism is in the lock position.
Figure 5:
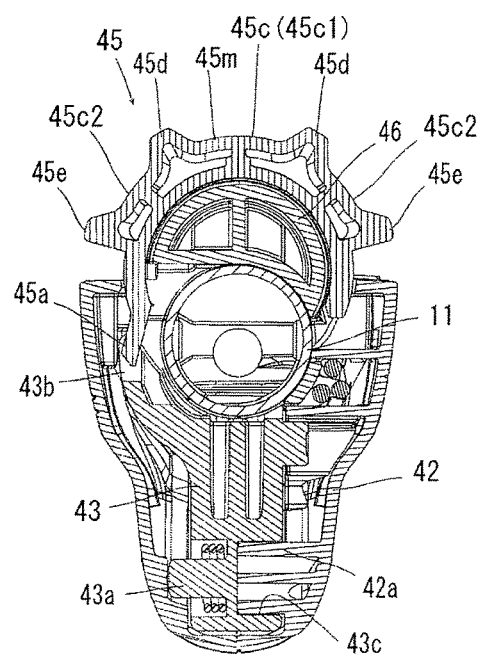
FIG. 5 is a front elevational view of the grip of FIG. 4 as sectioned along the arrowed line A-A of FIG. 2.

The power switch trigger 43 assumes the shape of an approximately L-shaped block extending in the longitudinal direction of the frame rod 11 as seen in FIGS. 2-4. The power switch trigger 43 has at its lower front part, as shown in FIGS. 3-5, a pivotal member 43a formed with a cylindrical bore 43c engaging with a stud 42a formed on the grip member 42 to be rotatably supported in the front of the grip 42 as to be turnable around a horizontal axis, thereby allowing the rear portion of the power switch trigger 43 to swing up and down with the stud 42a at the lower front part serving as the axis of rotation. The power switch trigger 43 is to energize the drive motor 22 when the rear portion is pressed up, which is the triggering actuation to turn on the power switch. As shown in FIGS. 4 and 5, the power switch trigger 43 is provided with a bumper member 43b facing frontward at the vertically middle position of the frame rod 11 at the right side of the power switch trigger 43, which bumper member 43b is to move backward and forward to collide against a stopper member 45a of a manipulating knob 45m of a safety lock mechanism 45 (to be explained hereinafter) when it is in the lock position, thereby prohibiting the power switch trigger 43 from swinging upward (i.e. prohibiting the bumper member 43b swinging forward) around the stud 42a.

As shown in FIG. 3, a switch module 44 is arranged in front of the power switch trigger 43 in the front part of the grip 42. The switch module 44 is provided with an actuator piece 44a which is urged against the power switch trigger 43, with the actuator piece 44a abutting against the upper front part of the power switch trigger 43. The switch module 44 is to output or cut an energizing power to the drive motor 22 depending on the front/rear position of the actuator piece 44a. While the power switch trigger 43 is not pressed up to its on-position, the actuator piece 44a stays at its rearmost position so that the switch module 44 does not output an energizing power to the drive motor 22. When the rear portion of the power switch trigger 43 is pressed up (swung upward), the actuator piece 44a is pushed by the upper front portion of the power switch trigger 43 to move forward, and the switch module 44 outputs an energizing power to the drive motor 22 in response to the front/rear position of the actuator piece 44a.

As illustrated in FIGS. 2-5, in the front of the grip 42 is arranged a safety lock mechanism 45 which normally renders the power switch trigger 43 inoperative in the lock position and temporarily renders the power switch trigger 43 operative in the release position when the user intends to press the power switch trigger 43. The safety lock mechanism 45 is to prevent an unintentional operation of the power switch trigger 43. The safety lock mechanism 45 is comprised of a manipulating knob 45m having a concavely arcuate inner surface extending circumferentially along about two thirds of a ring, and slidably engages on the upper surface of a guide member 46 having a convexly arcuate outer surface of a partial ring disposed on the frame rod 11 so that the manipulating knob 45m is supported by the guide member 46 and is turnable around an axis which is parallel to the longitudinal axis of the frame rod 11, sliding along the circumference of the guide member 46.

Figure 6A:
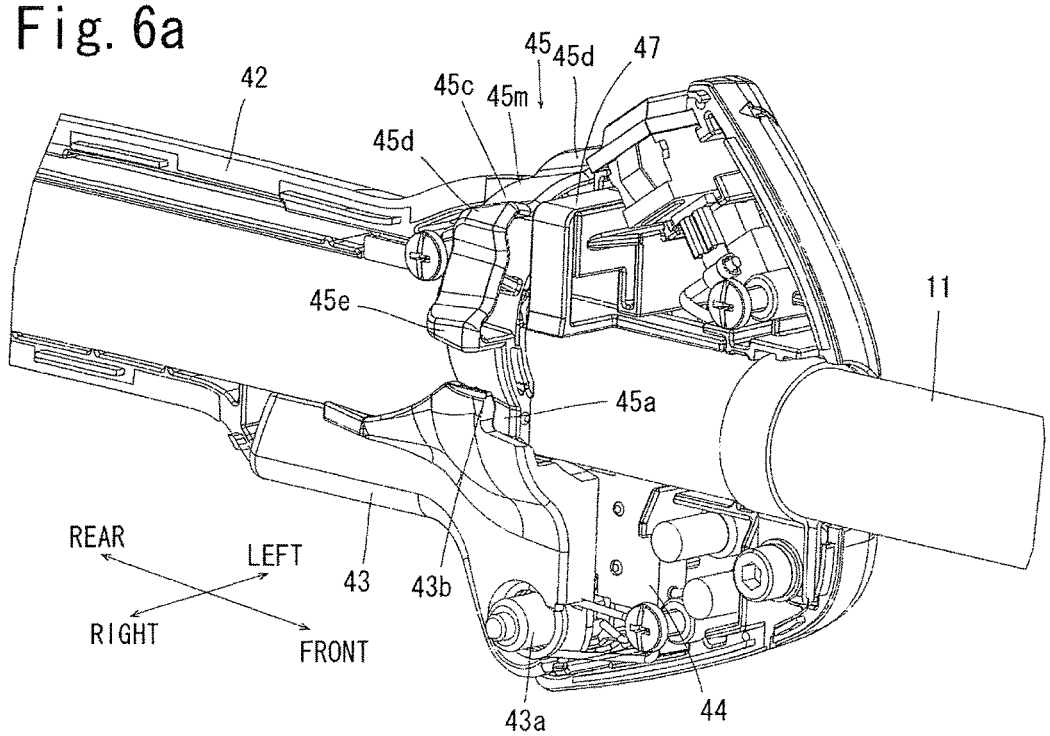
FIG. 6a is a perspective view of the front part of the grip as viewed in FIG. 4, but where the manipulating knob is turned clockwise to bring the safety lock mechanism to the release position.
Figure 6B:
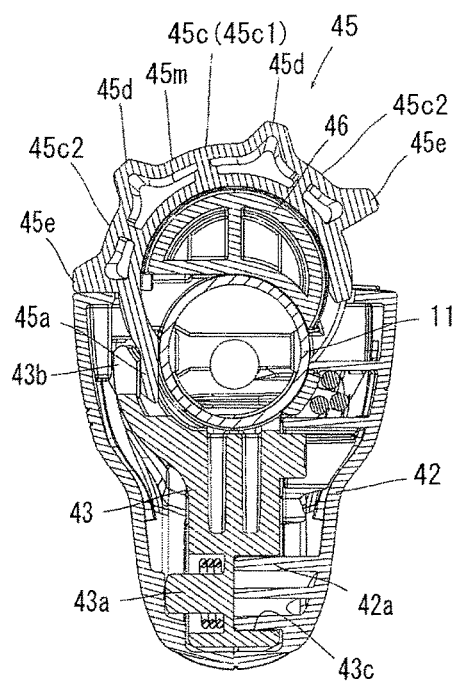
FIG. 6b is a front elevational view of the grip of FIG. 6a as sectioned along the arrowed line A-A of FIG. 2.
Figure 7A:
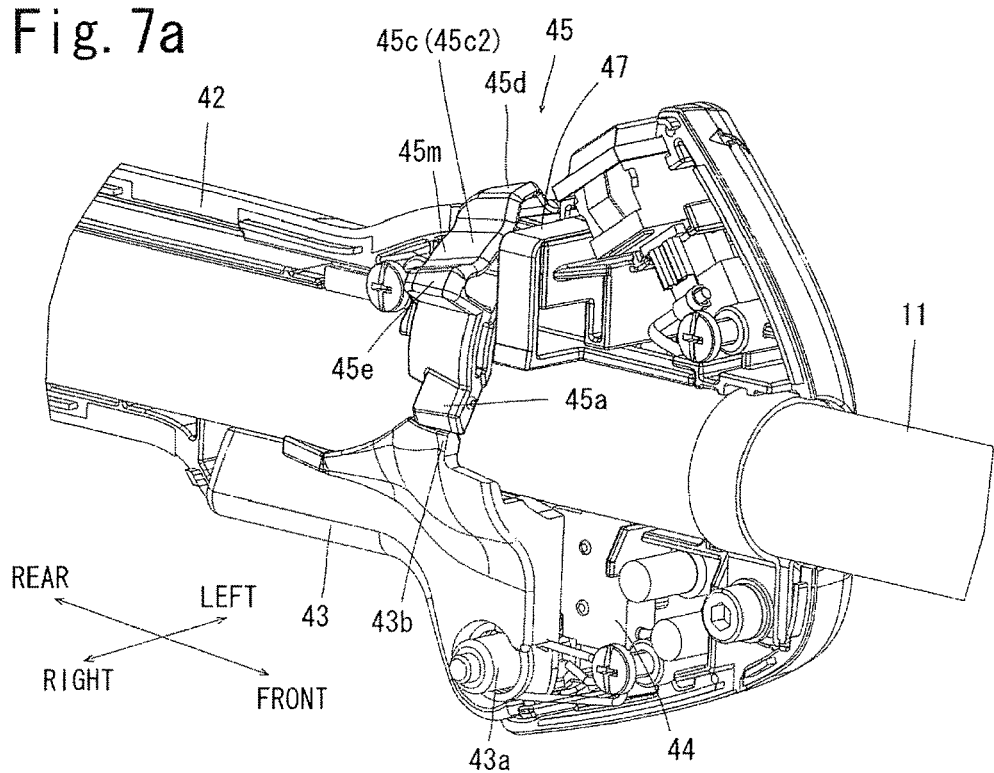
FIG. 7a is a perspective view of the front part of the grip as viewed in FIG. 4, but where the manipulating knob is turned counterclockwise to bring the safety lock mechanism to the release position.
Figure 7B:
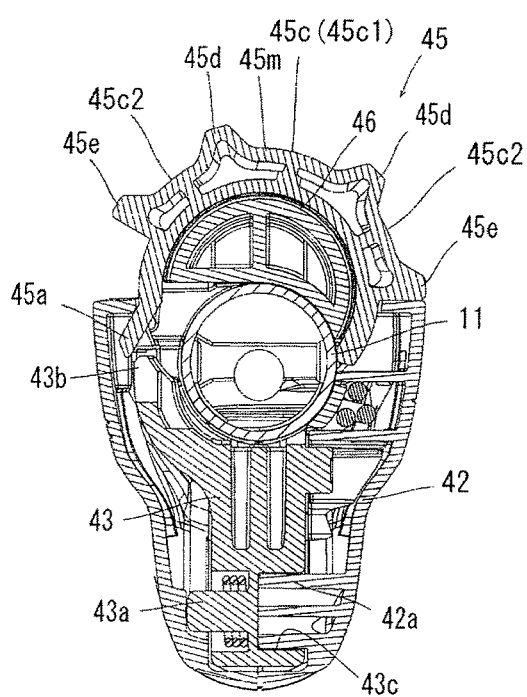
FIG. 7b is a front elevational view of the grip of FIG. 7a as sectioned along the arrowed line A-A of FIG. 2.
Figure 8:
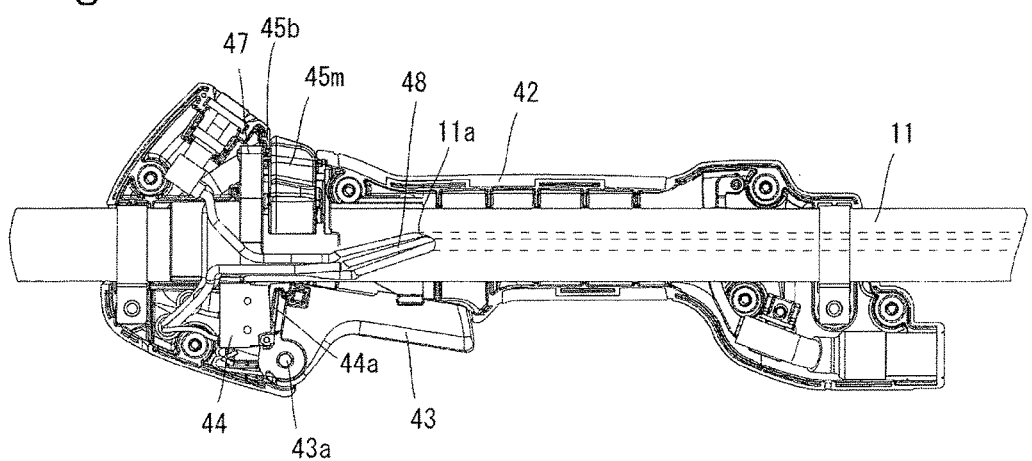
FIG. 8 is a side elevational view of the grip as viewed in FIG. 3, but where the electric wiring for connecting the switch module of the power switch trigger and other electric components to the controller unit is disposed through the frame rod.

In addition, as illustrated in FIGS. 4 and 5, the safety lock mechanism 45 is provided with a stopper member 45a formed by integrally extending the lower right end of the manipulating knob 45m. The stopper member 45a blocks the upward movement of the bumper member 43b of the power switch trigger 43, thereby rendering the power switch trigger 43 inoperative. When the manipulating knob 45m is turned clockwise or counterclockwise from the lock position to the release position as shown in FIGS. 6 and 7, the stopper member 45a moves aside from the position confronting the bumper member 43b, thereby rendering the power switch trigger 43 operative.

As seen in FIG. 4 the front part of the manipulating knob 45m of the safety lock mechanism 45 is formed with a positioning protrusion 45b projecting frontward, which positioning protrusion 45b is inserted into a spring case 47 arranged in front of the manipulating knob 45m. The spring case 47 contains two coil springs (urging means) 47a and 47b disposed in the right half and the left half thereof, respectively, and the positioning protrusion 45b is disposed between the coil springs 47a and 47b to normally stay at the center position. When the positioning protrusion 45b stays at the center position, the safety lock mechanism 45 is in the lock position to render the power switch trigger inoperative.

The manipulating knob 45m has an external surface with the diameter increasing toward the front end of the frame rod 11, as can be seen in FIGS. 4 and 5, serving as a manipulation surface (thumb rest) 45c to receive the thumb of the user when in use. The manipulation surface 45c of the manipulating knob 45m has a middle portion (center rest) 45c1 provided with two first protrusions 45d, 45d projecting outward at the both ends of the middle portion 45c1, which protrusions 45d, 45d are located at the positions about 30 degrees from the center of the middle portion 45c1. The manipulation surface 45c is further extended circumferentially beyond the first protrusions 45d, 45d and is provided with second protrusions 45e, 45e projecting outward at the positions about 75 degrees from the center. These protrusions 45d, 45d and 45e, 45e are provided in order to facilitate the turning manipulation of the manipulating knob 45m with the thumb of the user. The first protrusions 45d, 45d are preferably be located within the range between 20 degrees and 40 degrees from the center of the middle portion 45c1 of the manipulation surface 45c, while the second protrusions 45e, 45e are preferably be located within the range between 60 degrees and 80 degrees from the center of the middle portion 45c1.

With the vegetation cutter 10 configured as above, as the user holds the upper portion 41a of the loop handle 41 with his/her left hand, holds the grip 42 with his/her right hand, and turns the manipulating knob 45m clockwise or counterclockwise with his/her right thumb to shift aside the stopper member 45a from the position confronting the bumper member 43b of the power switch trigger 43, the rear portion of the power switch trigger 43 becomes swingable upward, rendering the power switch trigger 43 operative. As the user presses the power switch trigger 43 with his/her index and/or middle fingers of the right hand under this condition, the electric power from the battery pack 32 is supplied to the drive motor 22, and the rotary cutter 23 of the cutter head 20 is rotated by the energized drive motor 22. The user keeps the rotating rotary cutter floating a little bit above the ground and swings the frame rod 11 right and left to have the rotating rotary cutter sweep right and left on the grass, the grass growing on the ground will be cut off by the rotating rotary cutter 23.

According to the general style of use, the vegetation cutter 10 of this type will be operated with the rotating plane of the rotary cutter (in this embodiment, the plane defined by the rotating polyamide line) kept horizontal, and by swinging right and left in parallel with the ground surface. In the vicinity of an upright obstacle like a building wall and a standing post, however, the frame rod 11 would be turned circumferentially by 90 degrees to direct the rotating plane of the rotary cutter 23 vertical to the ground. When the user holds the handle 41 (at the side portion 41b) with his/her left hand and the grip 42 with his/her right hand, the frame rod 11 will be turned clockwise by 90 degrees to use the vegetation cutter 10. In this situation, the user will hold the grip 42 directing the back of the right hand toward the ground and placing the thumb on the manipulating knob 45m, and the user can release the safety lock mechanism 45 and operate the power switch trigger 43 without difficulty by turning the manipulating knob 45m counterclockwise with his/her right thumb and pressing the power switch trigger 43 with his/her right index and/or middle fingers. Conversely, when the user holds the handle 41 with his/her right hand and the grip 42 with his/her left hand, the frame rod 11 will be turned counterclockwise by 90 degrees to use the vegetation cutter 10. In this situation, the user will hold the grip 42 directing the back of the left hand toward the ground, and the user can release the safety lock mechanism 45 and operate the power switch trigger 43 without difficulty by turning the manipulating knob 45m clockwise with his/her left thumb and pressing the power switch trigger 43 with his/her left index and middle fingers. Thus, the frame rod 11 may be turned either clockwise or counterclockwise by 90 degrees for use, and the safety lock mechanism 45 and the power switch trigger 43 can be comfortably operated with the thumb and fingers of one hand.

With the vegetation cutter 10 configured as above, the manipulating knob 45m of the safety lock mechanism 45 is disposed at the position circumferentially opposite to the power switch trigger 43 with respect to the grip 42, which configuration facilitates the operation of the manipulating knob 45m with the thumb of the user when the user holds the grip 42 and presses the power switch trigger 43 with his/her index and/or middle finger. Thus, both when the vegetation cutter 10 is used with the rotary cutter 23 rotating in a horizontal plane parallel to the ground and when the vegetation cutter 10 is used with the rotary cutter 23 rotating in a vertical plane perpendicular to the ground by holding the grip 42 so that the frame rod 11 is turned 90 degrees clockwise or counterclockwise in the circumferential direction, the user can simultaneously operate the manipulating knob 45m of the safety lock mechanism 45 with his/her thumb and press the power switch trigger 43 with his/her index and/or middle finger in no difficult or uncomfortable posture. This greatly improves the manipulability of the safety lock mechanism 45.

As the manipulating knob 45m is configured to be turnable around an axis which is parallel to the longitudinal axis of the frame rod 11 between the lock position to render the power switch trigger 43 inoperative and the release position to render the power switch trigger 43 operative, simply gripping the grip 42 will not turn the manipulating knob 45m from the lock position to the release position. This prevents erroneous simultaneous actuations of the manipulating knob 45m and the power switch trigger 43, thereby preventing an inadvertent rotation of the rotary cutter 23.

The manipulating knob 45m is urged to the lock position by means of the coil springs 47a and 47b and is turnable both clockwise and counterclockwise around the axis which is parallel to the longitudinal axis of the frame tube 11, setting the release positions in both the clockwise direction and the counterclockwise direction. Thus, the manipulating knob 45m may be pushed either clockwise or counterclockwise with the thumb to release the safety lock mechanism 45. This is an improved manipulability of the manipulation knob 45m. Especially when the vegetation cutter 10 is used with the frame rod 11 turned circumferentially in either direction, clockwise or counterclockwise, by a certain amount of angle, without the thumb brought to an uncomfortable posture, thereby improving the manipulability of the manipulating knob 45m. While the coil springs 47a and 47b are used in the above-described embodiment to urge the manipulating knob 45m to the lock position, the invention is not limited to such a structure, but other urging means such as a leaf spring may be used.

The manipulating knob 45m has an outer surface curved along the outer surface of the grip 42 to serve as a manipulation surface 45c, which includes a middle portion (center thumb rest) 45c1 and first protrusions 45d, 45d formed at the both ends of the middle portion 45c1. The user will place his/her thumb on the middle portion 45c1 of the manipulating surface 45c and press either of the first protrusions 45d to turn the manipulating knob 45 either clockwise or counterclockwise. This configuration improves the manipulability of the manipulating knob 45m. In addition, the manipulation surface 45c is further extended beyond both of the first protrusions to form outer portions (side thumb rests) 45c2, 45c2, which are terminated by second protrusions 45e, 45e, respectively, apart from the first protrusions 45d, 45d. With this configuration, the user can place his/her thumb on either of the outer portions 45c2 to press either the first protrusion 45d or the second protrusion 45e depending on the posture of the grip 42, while the vegetation cutter 10 is used with the frame rod 11 turned clockwise or counterclockwise by some amount of angle. This configuration further improves the manipulability of the manipulating knob 45m.

In the embodiment described above, the switch module 44 actuated by the power switch trigger 43 and other electric components are connected to the control circuit (not shown) in the rear housing 31 via an electric wiring 48 which is disposed outside the frame rod 11 within the grip 42 as shown in FIG. 3. The electric wiring 48 may alternatively be introduced through an aperture 11a formed on the wall of the frame rod 11 into the inner bore of the frame rod 11 and may be disposed inside the frame rod 11 up to the rear housing 31. In such a configuration, the outer diameter of the grip 42 can be decreased accordingly.

While the above embodiment employs an electric motor as the drive motor 22, the present invention can be also useful for a vegetation cutter employing an internal combustion engine or another type of engine. Further, while the drive motor 22 is enclosed in the front housing 21 fixed to the front end portion of the frame rod 11, the present invention is not necessarily be limited to this type of configuration, but may be applicable to a vegetation cutter of the type in which the drive motor is enclosed in the rear housing fixed to the rear end portion of the frame rod 11. In such a configuration, the drive motor enclosed in the rear housing fixed to the rear portion of the frame rod 11 may be connected to the rotary cutter 23 arranged in the front housing fixed to the rear end portion of the frame rod 11 via a rotating drive shaft inserted through the frame rod 11 to rotate the rotary cutter 23.

The above embodiment employs a safety lock mechanism of a mechanical configuration in which the stopper member 45a of the manipulating knob 45 blocks the bumper member 43b of the power switch trigger 43 when the safety lock mechanism is in its lock position to render the power switch trigger 43 inoperative. However, the present invention is not necessarily limited to such a mechanical configuration, but may be practiced in an electric system in which the manipulating knob 45*m* staying at the lock position is electrically detected by means of a sensor such as a magnetic reed switch and the power switch trigger 43 is prohibited by some electric means from being operated under the locked condition, and the manipulating knob 45*m* staying at the release position is electrically detected by means of a sensor and the power switch trigger 43 is electrically rendered operative.

The above embodiment employs a manipulating knob 45*m* which is supported on the arcuate guide member 46 of a short fractional cylinder (partial ring) disposed on the frame rod 11 so that the manipulating knob 45*m* is turnable around an axis which is parallel to, but not identical to, the longitudinal axis of the frame rod 11, sliding along the circumference of the guide member 46. However, present invention is not necessarily limited to such a configuration, but should be expressly interpreted to include an embodiment in which the central axis of the arcuate guide member 46 is made identical to the longitudinal axis of the frame rod 11 so that the manipulating knob 45*m* is turnable around the longitudinal axis of the frame rod 11.

While in the above embodiment, the rotary cutter 23 is made of a polyamide line, the present invention can of course be practiced with the rotary cutter made of a disk blade of a metallic material to enjoy the merits of the present invention.

What is claimed is:

1. A vegetation cutter comprising:
   a frame rod having a longitudinal axis and a front end;
   a rotary cutter mounted on the front end of the frame rod;
   a drive motor for driving the rotary cutter;
   a grip disposed around the frame rod and having an external surface to be held by a user;
   a power switch trigger arranged on the grip for energizing the drive motor; and
   a safety lock mechanism for rendering the power switch trigger inoperative when the safety lock mechanism is in a lock position and for rendering the power switch trigger operative when the safety lock mechanism is in a release position, the safety lock mechanism including a manipulating knob for selectively setting the safety lock mechanism in the lock position and in the release position,
   wherein the manipulating knob is disposed on the grip at a position circumferentially opposite to the power switch trigger and is turnable around an axis which is parallel to the longitudinal axis of the frame rod to selectively bring the safety lock mechanism to the lock position and the release position.

2. A vegetation cutter as claimed in claim 1, wherein the manipulating knob is urged via an urging arrangement to normally stay at a neutral position bringing the safety lock mechanism to the lock position and is turnable toward a clockwise direction and toward a counterclockwise direction apart from the neutral position when forced by the user, to bring the safety lock mechanism to the release position by turning in either direction.

3. A vegetation cutter as claimed in claim 2, wherein the manipulating knob has a manipulation surface curved and extending circumferentially over and along the external surface of the grip and having a middle portion with two ends, and has two first protrusions formed on the manipulation surface at the two ends of the middle portion, respectively.

4. A vegetation cutter as claimed in claim 3, wherein the manipulation surface further extends circumferentially beyond the first protrusions and the manipulating knob further has second protrusions formed on the manipulation surface beyond and apart from the respective first protrusions.

5. A vegetation cutter as claimed in claim 2, wherein the urging arrangement comprises one or more springs.

6. A vegetation cutter as claimed in claim 1, wherein the grip disposed around the frame rod is arranged on the outer circumferential surface of the frame rod.

\* \* \* \* \*